US009567841B2

United States Patent
Rothrock et al.

(10) Patent No.: US 9,567,841 B2
(45) Date of Patent: Feb. 14, 2017

(54) CEMENTITIOUS FRACTURE FLUID AND METHODS OF USE THEREOF

(71) Applicant: Research Triangle Institute, Research Triangle Park, NC (US)

(72) Inventors: Ginger D. Rothrock, Cary, NC (US); Vikram Rao, Chapel Hill, NC (US); Vijay Gupta, Cary, NC (US); Leah Johnson, Durham, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 0 days.

(21) Appl. No.: 14/753,427

(22) Filed: Jun. 29, 2015

(65) Prior Publication Data

US 2016/0003022 A1 Jan. 7, 2016

Related U.S. Application Data

(60) Provisional application No. 62/019,471, filed on Jul. 1, 2014.

(51) Int. Cl.
*E21B 43/26* (2006.01)
*C09K 8/62* (2006.01)
*E21B 43/267* (2006.01)

(52) U.S. Cl.
CPC ............ *E21B 43/267* (2013.01); *C09K 8/62* (2013.01); *E21B 43/26* (2013.01); *C09K 2208/08* (2013.01)

(58) Field of Classification Search
CPC ........... E21B 43/26; E21B 43/267; C09K 8/62
See application file for complete search history.

(56) References Cited

U.S. PATENT DOCUMENTS 3,147,129 A * 9/1964 Armstrong, Jr. ........ C04B 7/323
106/123.11
3,366,178 A * 1/1968 Malone .................... C09K 8/62
166/280.1
(Continued)

FOREIGN PATENT DOCUMENTS

WO WO 2013101702 A1 * 7/2013 ............... D01D 5/30
WO WO 2015061420 A1 * 4/2015 ............. C04B 28/04
WO WO 2015130295 A1 * 9/2015 ............. E21B 43/26

OTHER PUBLICATIONS

Engels et al., "A Mechanical Methodology of Improved Proppant Transport in Low-Viscosity Fluids: Application of a Fiber-Assisted Transport Technique in East Texas," *SPE 9143*, 2004, pp. 1-11.
(Continued)

*Primary Examiner* — Zakiya W Bates
*Assistant Examiner* — Crystal J Miller
(74) *Attorney, Agent, or Firm* — Womble Carlyle Sandridge & Rice, LLP (57) ABSTRACT

The present disclosure relates to cementitious fluids comprising additives configured to form a permeable cement matrix after curing of the cement. The cementitious fluids can comprise a cementitious medium (e.g., a cement slurry) with a plurality of fibers dispersed therein. The fibers can be hollow, can be porous, and can be degradable. The cementitious fluid particularly can be used in methods of stimulating hydrocarbon bearing formations. Specifically, the cementitious fluid can be injected into the formation to form or enlarge a fracture, and the fluid can be cured to form the permeable cement matrix, said permeability arising from a loosely assembled tubular network and/or passages remaining after degradation of the fibers.

16 Claims, 3 Drawing Sheets

(56) References Cited

U.S. PATENT DOCUMENTS

| | | | |
|---|---|---|---|
| 3,861,929 A * | 1/1975 | Deets | C04B 7/323 |
| | | | 106/695 |
| 3,948,672 A * | 4/1976 | Harnsberger | E21B 43/025 |
| | | | 106/720 |
| 5,842,518 A | 12/1998 | Soybel et al. | |
| 5,916,678 A * | 6/1999 | Jackson | D01F 8/10 |
| | | | 428/370 |
| 6,323,307 B1 * | 11/2001 | Bigg | C08L 57/00 |
| | | | 524/306 |
| 6,698,519 B2 * | 3/2004 | Nguyen | C04B 26/10 |
| | | | 166/294 |
| 6,776,235 B1 | 8/2004 | England | |
| 7,032,663 B2 * | 4/2006 | Nguyen | C04B 28/02 |
| | | | 106/724 |
| 7,044,224 B2 * | 5/2006 | Nguyen | C09K 8/665 |
| | | | 106/600 |
| 7,172,022 B2 * | 2/2007 | Reddy | C04B 28/02 |
| | | | 106/677 |
| 7,267,170 B2 * | 9/2007 | Mang | C09K 8/467 |
| | | | 166/278 |
| 7,275,596 B2 * | 10/2007 | Willberg | C09K 8/68 |
| | | | 166/278 |
| 7,350,572 B2 * | 4/2008 | Fredd | C09K 8/72 |
| | | | 166/279 |
| 7,380,601 B2 * | 6/2008 | Willberg | C09K 8/68 |
| | | | 166/280.1 |
| 7,494,957 B2 | 2/2009 | Pena et al. | |
| 7,569,522 B2 | 8/2009 | Pena et al. | |
| 7,581,590 B2 * | 9/2009 | Lesko | C09K 8/665 |
| | | | 166/280.1 |
| 7,677,312 B2 * | 3/2010 | Boney | C04B 28/02 |
| | | | 166/280.1 |
| 7,732,032 B2 * | 6/2010 | Dubey | C04B 16/0641 |
| | | | 106/672 |
| 7,833,950 B2 * | 11/2010 | Willberg | C09K 8/68 |
| | | | 166/305.1 |
| 7,857,054 B2 | 12/2010 | Boney et al. | |
| 8,188,013 B2 * | 5/2012 | Mang | D01D 5/24 |
| | | | 166/280.1 |
| 8,230,925 B2 * | 7/2012 | Willberg | C09K 8/68 |
| | | | 166/280.1 |
| 8,490,700 B2 * | 7/2013 | Lesko | C09K 8/665 |
| | | | 166/280.1 |
| 8,598,092 B2 * | 12/2013 | Mang | C04B 28/02 |
| | | | 166/305.1 |
| 8,636,035 B2 | 1/2014 | Lundman | |
| 8,657,002 B2 * | 2/2014 | Willberg | C09K 8/68 |
| | | | 166/280.1 |
| 8,714,249 B1 * | 5/2014 | Tang | C09K 8/725 |
| | | | 166/281 |
| 8,881,813 B2 * | 11/2014 | Nguyen | C09K 8/685 |
| | | | 166/280.1 |
| 8,905,133 B2 * | 12/2014 | Potapenko | E21B 21/003 |
| | | | 166/285 |
| 9,027,641 B2 * | 5/2015 | Alekseenko | E21B 43/26 |
| | | | 166/250.1 |
| 9,040,468 B2 * | 5/2015 | Loiseau | C09K 8/82 |
| | | | 507/219 |
| 9,080,440 B2 * | 7/2015 | Panga | C09K 8/70 |
| 2003/0155124 A1 * | 8/2003 | Nguyen | C04B 26/10 |
| | | | 166/287 |
| 2004/0261993 A1 * | 12/2004 | Nguyen | C04B 28/02 |
| | | | 166/276 |
| 2004/0261999 A1 * | 12/2004 | Nguyen | C09K 8/665 |
| | | | 166/292 |
| 2005/0205258 A1 * | 9/2005 | Reddy | C04B 28/02 |
| | | | 166/292 |
| 2006/0042797 A1 * | 3/2006 | Fredd | C09K 8/72 |
| | | | 166/282 |
| 2006/0112862 A1 * | 6/2006 | Nguyen | C04B 28/02 |
| | | | 106/819 |
| 2006/0147681 A1 * | 7/2006 | Dubey | C04B 16/0641 |
| | | | 428/192 |
| 2006/0169449 A1 * | 8/2006 | Mang | C09K 8/467 |
| | | | 166/278 |
| 2006/0283591 A1 * | 12/2006 | Willberg | C09K 8/68 |
| | | | 166/280.1 |
| 2007/0100029 A1 * | 5/2007 | Reddy | C04B 28/02 |
| | | | 524/5 |
| 2007/0289743 A1 * | 12/2007 | Willberg | C09K 8/68 |
| | | | 166/280.2 |
| 2008/0009423 A1 * | 1/2008 | Mang | D01D 5/24 |
| | | | 507/219 |
| 2008/0135242 A1 * | 6/2008 | Lesko | C09K 8/665 |
| | | | 166/268 |
| 2008/0236823 A1 * | 10/2008 | Willberg | C09K 8/68 |
| | | | 166/276 |
| 2009/0032252 A1 * | 2/2009 | Boney | C04B 28/02 |
| | | | 166/280.2 |
| 2009/0176665 A1 * | 7/2009 | Mang | D01D 5/24 |
| | | | 507/101 |
| 2010/0126723 A1 * | 5/2010 | Ali | C09K 8/508 |
| | | | 166/281 |
| 2011/0056684 A1 * | 3/2011 | Willberg | C09K 8/68 |
| | | | 166/276 |
| 2012/0129737 A1 * | 5/2012 | Lesko | C09K 8/665 |
| | | | 507/211 |
| 2012/0132421 A1 * | 5/2012 | Loiseau | C09K 8/82 |
| | | | 166/279 |
| 2012/0238173 A1 * | 9/2012 | Bond | D01F 8/14 |
| | | | 442/362 |
| 2012/0247764 A1 * | 10/2012 | Panga | C09K 8/70 |
| | | | 166/280.2 |
| 2012/0267103 A1 * | 10/2012 | Willberg | C09K 8/68 |
| | | | 166/279 |
| 2012/0285692 A1 * | 11/2012 | Potapenko | E21B 21/003 |
| | | | 166/308.1 |
| 2013/0032349 A1 * | 2/2013 | Alekseenko | E21B 43/26 |
| | | | 166/308.1 |
| 2013/0048282 A1 * | 2/2013 | Adams | E21B 43/267 |
| | | | 166/279 |
| 2013/0248191 A1 * | 9/2013 | Nguyen | C09K 8/685 |
| | | | 166/308.1 |
| 2013/0310491 A1 * | 11/2013 | Crandall | D01F 6/92 |
| | | | 524/47 |
| 2014/0116698 A1 * | 5/2014 | Tang | E21B 43/267 |
| | | | 166/280.2 |
| 2014/0116701 A1 * | 5/2014 | Tang | C09K 8/725 |
| | | | 166/292 |
| 2014/0116702 A1 * | 5/2014 | Tang | C09K 8/703 |
| | | | 166/295 |
| 2014/0116711 A1 * | 5/2014 | Tang | C09K 8/62 |
| | | | 166/308.4 |
| 2014/0131040 A9 * | 5/2014 | Panga | C09K 8/70 |
| | | | 166/280.2 |
| 2014/0131042 A1 * | 5/2014 | Nguyen | C09K 8/80 |
| | | | 166/280.2 |
| 2014/0144633 A1 * | 5/2014 | Nguyen | E21B 43/261 |
| | | | 166/281 |
| 2014/0144635 A1 * | 5/2014 | Nguyen | E21B 43/267 |
| | | | 166/281 |
| 2014/0174737 A1 * | 6/2014 | Reddy | C09K 8/426 |
| | | | 166/281 |
| 2014/0290945 A1 * | 10/2014 | Potapenko | E21B 21/003 |
| | | | 166/281 |
| 2014/0326452 A1 * | 11/2014 | Loiseau | C09K 8/82 |
| | | | 166/278 |
| 2014/0374106 A1 * | 12/2014 | Zhu | D01D 5/30 |
| | | | 166/305.1 |
| 2015/0087560 A1 * | 3/2015 | Abe | C09K 8/12 |
| | | | 507/102 |
| 2015/0126414 A1 * | 5/2015 | Abe | C09K 8/12 |
| | | | 507/117 |

(56) References Cited

U.S. PATENT DOCUMENTS

2015/0240613 A1* 8/2015 Alekseenko ............ E21B 43/26
166/280.1

OTHER PUBLICATIONS

Gardunño et al., "Synergy Between Engineered Fibers and Lightweight Cement Slurries to Cement Depleted Formations," *IADC/SPE 10385*, 2006, pp. 1-8.

Huynh et al., "Expansive Cements and Soundless Chemical Demolition Agents: State-of-Technology Review," Published Oct. 2009. Presented at the 11$^{th}$ Conference on Science and Technology, Ho Chi Minh City, Vietnam, Oct. 21-23, 2009. http://hdl.handle.net/10197/2285, 6 pages.

Saheri, et al. "Natural Fibre Reindorced Bioderadable Polymer Composites," *Reviews on Advanced Materials Science*, 2011, pp. 166-174, vol. 30.

Salehi et al., "A Novel Cement Slurry Desing Applicable to Horizontal Well Conditions," *Petroleum & Coal*, 2009, pp. 270-276, vol. 51, No. 4.

Sitdikov et al., "Fiber-Laden Fluid-Applied Solution for Addressing Multiple Challenges of Hydraulic Fracturing in Western Siberia," *SPE 119825*, 2009, pp. 1-14.

Van Vliet et al. "Development and Field Use of Fibre-Containing Cement," *27$^{th}$ Annual OTC*, Houston, Texas, 1995, pp. 183-197.

Visudevan et al. "Field Test of a Novel Low Viscosity Fracturing Fluid in the Lost Hills Field," *SPE 68854*, 2001, pp. 1-11.

\* cited by examiner

CEMENTITIOUS FRACTURE FLUID AND METHODS OF USE THEREOF

FIELD OF THE DISCLOSURE

The present disclosure relates to compositions configured to form a permeable cement matrix. The compositions particularly can be used as fracture fluids for use in stimulating hydrocarbon formations. The compositions can comprise fibers dispersed in a cementitious medium.

BACKGROUND OF THE DISCLOSURE

Recent developments in fracturing technology have led to significant increases in the recovery of oil and gas deposits, such as natural gas deposits bound in tight shale formations. Hydraulic fracturing technologies are the primary means for well stimulation to increase the permeability of the reservoir and enhance recovery of oil and gas. During hydraulic fracturing, a fluid is pumped down into the wellbore at a pressure sufficient to cause fractures in the reservoir, and proppants suspended in the fracturing fluid are used to keep the fractures open and enable gas to subsequently flow into the wellbore. The fracturing fluid will often contain viscosifying or gelling agents to increase the viscosity so that proppants can be suspended in the fracturing fluid during the process.

Although in-place, unconventional resources are substantial, recovery efficiencies are commonly low in these reservoirs. Although improved technologies have increased recovery percentage, significant performance gains are still to be made. Additionally, the widespread proliferation of new gas wells and the use of modern drilling and extraction methods have been identified as a global conservation issue. The alternative to hydraulic fracturing is to drill more wells in an area, a solution that is often economically or geographically prohibitive. Several hurdles to significant technology advancements still remain.

In aqueous fracturing fluids, the proppants must be suspended using a combination of additives and turbulent flow. As flow naturally slows, the proppants have a tendency to settle, leading to reduced permeability and potential damage to surface equipment or long horizontal laterals. Conventional fracturing fluids are also not suitable for unconsolidated reservoirs because the formation material can re-consolidate around the proppants or the proppants can get embedded into the formation, leading to reduced permeability.

Long-term production also can suffer with known fracture methods. For example, as the well is produced, changes in pressure and fluids cause proppant shift, resulting in premature closure and rapidly declining production over the life of the well. Also, proppant debris generated during the fracturing process is mobilized over time, obstructing the pathway and resulting in loss of flow capacity for hydrocarbon. Relatedly, the gelling agents used to suspend the proppant ultimately block the pores and reduce the permeability of the reservoir.

Water use in known fracture methods also is a concern. A significant volume of water is required for fracture operations, and the balance is either lost to the formation as leak-off or returned as flowback water that must be treated. A growing number of challenges and limited options are associated with properly treating and disposing of hydrofracturing wastewater in light of strict regulations and high treatment costs To address fracture efficiency, a host of fracturing fluid additives and proppants are under development and in practice. For slickwater fluids, known to be inherently poor proppant carriers, viscoelastic surfactant gel fluids are one of many gelling additives that have been considered. Principally, these fluids use surfactants in combination with inorganic salts to create ordered structures, which result in increased viscosity and elasticity. Engineered proppants are also increasing in utility, providing uniform, spherical packing and reducing the production of fines typically produced at high pressure and impact. Thus far, engineered proppants have been limited in utility because of their high cost relative to sand.

Non-aqueous fracturing fluids are gaining attraction for several reasons, including environmental and economic concerns surrounding flowback and produced water and potential for more efficient production through elimination of both aqueous phase trapping from capillary retention of the water, and residual gels and surfactant. Non-aqueous fluids include polymer/methanol-based, oil-based, and gas-based systems; each of these approaches has limitations, from the perspectives of cost, safety, and/or reliability. Oil- and alcohol-based fracturing fluids suffer from cost pressures and health and environmental safety concerns due to flammability and environmental impact. Pure and binary gas mixtures of $CO_2$ and $N_2$ have been employed to a limited extent to date. The main disadvantage of these fluids is safety (i.e., pumping a gas at high pressure), and proppant dispersion has been a challenge.

Improvements in additive and proppant technologies are also being employed to increase long-term production. Much emphasis has been placed on reducing polymer concentration and/or adding breakers to cleave the polymer chains after placement. Polymer residue tends to block the pore spaces between proppant particles and, due to fluid loss to the formation, polymer additives are left at higher concentrations, leaving a gelled mass. Encapsulated breakers and crosslinked fluids are being employed to improve performance without increasing concentration. Reducing proppant flowback after treatment is also under investigation. As greater fracture widths and higher proppant concentrations are becoming the norm, up to 20% or even 50% of proppant can be produced back resulting in premature closure or termination of production. Resin-coated proppant that can be cured after placement for flowback control has gained in popularity. Although less expensive than engineered ceramic proppants, the utility of resin-coated proppant has been limited because of concerns around hydrocarbon permeability through the resin and the higher cost as compared with uncoated sand. These limitations have led to the use of resin-coated proppants at just the end of each fracture stage. Fiber-laden fracturing slurries also have been used to improve fracture geometries and enhance production. Fibers and fiber bundles aid in proppant suspension and can be made degradable to reduce concerns over residue blocking pores.

A wide variety of processes, technologies, and management strategies are under development and in use to address the foregoing problems. One proposal for stimulating subterranean formations has been through use of a fracturing fluid comprising a permeable cement composition. See, for example, U.S. Pat. No. 7,044,224, which proposes the use of cements formulated with degradable polymer additives or dehydrated salts that dissolve over time as the salts hydrate. Removal of such additives is intended to form natural voids in the cement matrix; however, unless the proposed voids are interconnected, they do not contribute to enhanced production. Additionally, increases in void volume must be carefully balanced with mechanical strength, as too much porosity can cause collapse of the structural unit. Accordingly, there remains a need for further materials useful in fracture fluids.

BRIEF SUMMARY OF THE INVENTION

The present invention provides cementitious fracture fluids and methods of use thereof in stimulating a hydrocarbon bearing formation. The cementitious fracture fluids can be modified cement slurries that are configured to function as a dual propping agent and hydraulic fracturing fluid. Cements offer high strength at low cost with long term durability in downhole conditions. While cements have been used extensively in relation to hydrocarbon bearing formations, such used has been typically limited to structural elements of a drilled well—e.g., a well casing. The present disclosure extends the use of cementitious materials in hydrocarbon bearing formations by ensuring that the cured cementitious material provides sufficiently high permeability between the formation and the wellbore for maximum extraction of the hydrocarbon, particularly gaseous hydrocarbons—e.g., natural gas.

In some embodiments, a cementitious fracture fluid according to the present disclosure can comprise fibers dispersed in a cementitious medium. The cementitious medium particularly can be a slurry of a cement in water along or with one or more additives. Any cement material suitable for use in a hydrocarbon bearing formation can be used as the cementitious medium. For example, Portland cement can be used alone or in combination with further cements. In some embodiments, expansive cements can be used alone or in combination with a further cement, such as Portland cement. For example, sulfoaluminate cements or other Type K cements may be used as the expansive cement.

The cementitious fracture fluid can comprise a wide variety of tubular additives, including degradable fibers, hollow fibers, and loosely assembled or self-assembled tubular networks. In some embodiments, the cementitious fracture fluid can comprise fibers selected from the group consisting of hollow fibers, degradable fibers, and combinations thereof. The fibers can be present in the cementitious fracture fluid in a define concentration, such as a concentration of about 2% to about 40% by volume, more particularly about 2% to about 20% by volume or about 2% to about 10% by volume. In some embodiments, the fibers can comprise one or more of hollow glass fibers and polymeric fibers. In certain embodiments, the fibers can be degradable. For example, the fibers can comprise one or both of hydrolytically degradable fibers and enzymatically degradable fibers. In some embodiments, the fibers can comprise a degradable material selected from the group consisting of aliphatic polyesters, polyorthoesters, polyanhydrides, and combinations thereof. More particularly, the fibers can comprise a degradable material selected from the group consisting of polylactic acid (PLA), polyglycolic acid (PGA), copolymers of PLA and PGA (PLGA), polycaprolactone (PCL), thermoplastic starch (TPS), cellulose, polyhydroxyalkanoates (PHAs), blends of phosphate-based glasses and polypropylene, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and combinations thereof. In some embodiments, the fibers can have a specific melting temperature, such as a temperature of about 80° C. to about 190° C. or a temperature of about 90° C. to about 180° C.

In various embodiments, the present disclosure particular can provide methods for stimulating a hydrocarbon bearing formation. Such stimulating in particular can include increasing the rate and/or volume of production of a hydrocarbon from the formation. More specifically, such stimulating can include creating and/or enlarging one or more fractures in the hydrocarbon bearing formation.

In some embodiments, a method according to the present disclosure can comprise: providing a cementitious fracture fluid comprising fibers dispersed in a cementitious medium; injecting the cementitious fracture fluid into the hydrocarbon bearing formation at a pressure sufficient to create or enlarge a fracture therein; and curing the injected cementitious fracture fluid to form a permeable cement matrix comprising a continuous network of interconnected channels corresponding to the position of the dispersed fibers, the interconnected channels being configured for flow of the hydrocarbon therethrough. In some embodiments, the fibers used in the cementitious fracture fluid can be chemically tuned to have alkaline stability for the duration of the injecting (e.g., the fracturing process). Thereafter, the fibers can be configured to degrade at the formation temperature and/or other formation conditions after the cement has set (e.g., during or after curing). In particular, the fibers can be configured to degrade after the injecting step over a time of about 6 hours to about 240 hours, preferably about 6 hours to about 24 hours.

In some embodiments, the injecting step can comprise alternating between injecting the cementitious fracture fluid and injecting a second fluid of a different composition. The cementitious fracture fluid can be alternated with traditional fracture fluids and/or unconventional fracture fluids, including aqueous-based fracturing fluids containing proppant, proppant-free aqueous solutions, foaming fracture fluids, oil- or gas-based fracture fluids, and combinations thereof. The permeable cement matrix formed by the cementitious fracture fluid can be useful to stabilize fractures, and the second fluid can be useful to enhance permeability of the fracture. If desired, the second fluid can be configured to degrade or dissolve during or after the curing of the cementitious fracture fluid. In some embodiments, the second fluid can comprise a material selected from the group consisting of polylactic acid (PLA), polyglycolic acid (PGA), polyols, polyethylene terephthalate (PET), polysaccharides, waxes, salts, calcium carbonate, benzoic acid, naphthalene based materials, magnesium oxide, sodium bicarbonate, soluble resins, sodium chloride, ammonium sulfate, and combinations thereof. In some embodiments, the second fluid can be configured to be stable in the conditions of the hydrocarbon bearing formation, and the second fluid can have a permeability that is greater than the permeability of the cured cement matrix. These and further embodiments of the present disclosure are described in greater detail below.

In some embodiments, the present disclosure can relate to certain structures formed with a cementitious fluid as described herein. For example, the disclosure can relate to an artificially formed underground structure. In particular, such structure can comprise a hydrocarbon bearing formation with a fracture therein and an at least partially cured permeable cement matrix at least partially filling the fracture, the cement matrix including a continuous network of interconnected channels configured for flow of the hydrocarbon therethrough. The interconnected channels can comprise fibers or remnants thereof (i.e., degradation products and/or remaining portions of a fiber that has degraded). The fibers can be selected from the group consisting of hollow fibers, degradable fibers, and combinations thereof. The fibers can comprise one or both of hydrolytically degradable fibers and enzymatically degradable fibers.

BRIEF DESCRIPTION OF THE FIGURES

Having thus described the invention in the foregoing general terms, reference will now be made to the accompanying drawings, which are not necessarily drawn to scale, and wherein:

DETAILED DESCRIPTION OF THE DISCLOSURE

The present disclosure will now be described more fully hereinafter with reference to exemplary embodiments thereof. These exemplary embodiments are described so that this disclosure will be thorough and complete, and will fully convey the scope thereof to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure provides cementitious fracture fluids that can be useful in methods for stimulating hydrocarbon bearing formations. While the cementitious fluids are particularly useful in such methods, their use is not so limited. Rather, the disclosed cementitious fluids can be utilized in any setting where it is desirable to provide permeable cement.

The cementitious fracture fluids useful according to the present disclosure can comprise a cementitious medium with tubular additives dispersed therein. More particularly, the cementitious fracture fluid can comprise a cementitious medium, such as a slurry of cement and water, including degradable fibers, hollow fibers, loosely assembled or self-assembled tubular networks, and combinations thereof.

The cementitious fracture fluids utilize cement as a proppant. The cement is configured to remain in an existing or newly formed fracture in the hydrocarbon formation. The formed cement matrix is permeable and thus allows passage of the hydrocarbon therethrough, and such permeability arises from the presence of the fiber additives in the cementitious fracture fluid.

Any cement suitable for use in a hydrocarbon formation can be used. Preferably, the cement is utilized in the form of a slurry with water. In some embodiments, Portland cement is used; however other cements may be used, such as gypsum cement, pozzolanic cement, low density cement, silica cement, high alumina content cement, and the like. Combinations of two or more types of cements may be used. When combinations are used, one of the cements may be an expansive cement, such as sulfoaluminate or Type K cements. Expansive cements can be used in an amount useful to result in a cured cement matrix with a volume increase of up to 30% relative to the same mass of cement in the absence of the expansive cement. In some embodiments, magnesium based shrinkage compensating additives can also be used.

The cementitious fracture fluid particularly can be configured as a modified cement slurry that is a dual propping agent and hydraulic fracturing fluid. The cement slurry can be formulated with retarders, weighting agents, and other additives as desired to provide the required pump time and viscosity needed to fracture a reservoir (i.e., the hydrocarbon bearing formation). Other additives commonly used with cement also may be used.

The cementitious fracture fluid can include a variety of fibers formed from a variety of materials configured to provide the continuous network of interconnected channels having a desired level of permeability. In some embodiments, the fibers can provide the network of interconnected channels based at least in part on the nature of the fibers as hollow tubes. In particular, hollow fibers can be utilized in a sufficient concentration to form a loosely assembled or self-assembled tubular network. The inner diameter of the hollow tubes can be sufficiently small to avoid blockage by the cementitious medium during mixing and injection. If desired, porous hollow fibers also may be used to further increase the permeability of the resulting cement matrix.

In some embodiments, tubular networks may be formed using self-assembling molecules. Self-assembly can be via a variety of molecular interactions, including non-covalent interactions, such as hydrogen bonding, metal coordination, hydrophobic forces, electrostatic forces, van der Waals forces, chemical crosslinking reactions, and $\pi$-$\pi$ (pi-pi) interactions. Such self-assembly includes not only supramolecular assembly of the individual molecules but also self-organization into networks of elongated chains that can be substantially tubular or that can result in the formation of tubular structures. In some embodiments, supramolecular assembly can comprise the use of molecules with a propensity for forming linear chains. Self-assembled tubular networks can be branched and can have a continuous length that exceeds the length of fibers that may be used in other embodiments of the present disclosure. Supramolecular assembly can be designed to proceed under defined conditions including the shear state of the cement (e.g., injection versus setting), temperature, water conditions, and the like. In some embodiments, self-assembly can proceed once the cement slurry comes to rest or is subject to only substantially low shear rates. Self-assembled networks can comprise supramolecular assembled tubules, which can be substantially continuous or can be shorter such as analogous to staple fibers, and the formed tubules can persist in the cured cement matrix. The assembled tubular structures can form continuous arrangements throughout the cementitious medium, which produces permeable channels template throughout the cement. In some embodiments, self-assembled networks can be formed of degradable materials such that self-assembled networks of hollow and/or solid elongated molecular chains can form in the curing cement slurry, and the so-formed elongated molecular chains can then degrade to provide open networks corresponding to the previous positions of the self-assembled networks.

In some embodiments degradable fibers particularly may be used. In particular, the degradable fibers can be configured to remain intact throughout mixing and placement. Thus, the fibers can remain intact throughout a fracturing process, for example. The fibers can be configured to begin to degrade once the cementitious medium reaches a defined state, such as the gelation point. The fibers specifically can exhibit no greater than about 10%, no greater than about 5%, or no greater than about 2% degradation during mixing and placement. The fibers dispersed within the cementitious medium can form contiguous pathways while the cementitious medium hardens around the fibers. Once the cementitious medium has achieved a desired state of curing or hardening, the fibers can be configured to degrade and leave behind the continuous network of interconnected channels.

Materials suitable for forming degradable fibers useful in the present cementitious materials can vary and can be chosen based upon the specific conditions of the formation in which the materials will be injected. For example, polymers forming degradable fibers useful according to the present disclosure can have a melting temperature that is sufficiently low to prevent degradation during compounding and during the injection process and that is sufficiently high to provide thermal stability during use of the fiber. In some embodiments, polymers useful for degradable fibers can have a melting temperature of about 80° C. to about 190° C. or about 90° C. to about 180° C. The fibers can be formed of a mixture of materials. For example, higher melting polymers may be used in combination with plasticizers, diluents, or the like that are effective to lower the melting point of the polymer to the desired range.

Materials forming the degradable fibers may be natural or synthetic. In some embodiments, aliphatic polyesters, polyorthoesters, and polyanhydrides particularly may be used. Non-limiting examples of materials suitable for use in degradable fibers according to the present disclosure include polylactic acid (PLA), polyglycolic acid (PGA), copolymers of PLA and PGA (PLGA), polycaprolactone (PCL), thermoplastic starch (TPS), cellulose, polyhydroxyalkanoates (PHAs), polypropylene, blends of phosphate-based glasses and polypropylene, copolymers of glycolic acid with other hydroxy-, carboxylic acid-, or hydroxycarboxylic acid-containing moieties, and copolymers of lactic acid with other hydroxy-, carboxylic acid-, or hydroxycarboxylic acid-containing moieties. Combinations of one or more materials also may be used.

The degradable fibers particularly may comprise polymers with molecular chains comprising one or more bond cleavage segments. Specifically, the fibers may be configured to be hydrolytically, thermally, ionically, or enzymatically degradable. For example, polymeric fibers can contain chemical groups that undergo retro-Diels Alder reactions above a defined temperature (e.g., greater than about 120° C.) to regenerate dienes and dienophiles. In further examples, hydrolytic degradation of synthetic polyesters can occur in the middle of the chain or at the end of the chain. The random scission where the decomposition occurs in the middle of the chain is dominantly observed in the early stage of polymer decomposition, and as the number of polymer chains increase as the polymer decomposes, the chain-end scission is more dominant where the hydrolysis occurs at the end of the chain. As non-limiting examples, PLA can decompose by such mechanism to lactic acid, PGA can decompose to glycine, and PCL can decompose to organic acids such as 6-hydroxyhexanoic acid. Such decomposition products can be converted to carbon dioxide and water through further reactions. Factors contributing to the degradation process can include molecular weight, molecular structure, hydrophobicity, pH, crystallinity, and melting point. In some embodiments, fiber degradation can be facilitated by water contact and basic pH of the cementitious medium. Degradation speed can be slowed with highly crystalline polymers as the well-organized molecules will delay the internal ester unit and water reaction. In some embodiments, the polymer may be configured to degrade due to the heat of hydration from the cementitious material.

The degradable fibers can be configured to degrade over a define time period. The time period can be calculated from the beginning of preparation of the cementitious fluid—i.e., the dispersion of the fibers into a cement slurry. The time period can be calculated from the beginning of injection of the cementitious fluid with the dispersed fibers into a formation. The time period can be calculated from beginning of curing of the injected cementitious fluid (e.g., the time when injection ceases and the formation is shut in). The time period can be calculated from the time when the cementitious medium has reached a defined state, such as the gelation point. The time period in some embodiments can be about 6 hours to about 240 hours. The time period in further embodiments can be about 6 hours to about 24 hours. Preferably, the fibers can be configured so as to avoid substantial degradation into precipitation products in the presence of ions, such as calcium and magnesium. Examples of degradable fiber systems that may be useful according to the present disclosure are provided in U.S. Pat. No. 7,380, 601, which is incorporated herein by reference in its entirety.

The permeability of the cement matrix remaining after curing of the cementitious fracture fluid and degradation of the fibers can be varied and can be controlled to achieve desired properties. For example, permeability can be controlled by fiber diameter, fiber length, and fiber concentration. In some embodiments, permeability can be customized to allow for passage of gases, such as natural gas, but to substantially prevent or significantly slow passage of liquids, such as water, therethrough. Accordingly, the present compositions can be particularly useful in hydrocarbon formations with a high water content where the fracture fluid can provide fractures at least partially filled with a permeable cement matrix that exhibit high gas permeability and low water permeability.

Materials such as those described above can be blended with one or more further materials and/or can be utilized as one component of a multicomponent fiber. For example, the degradable polymer can be blended with a non-degradable polymer to form fibers that only partially degrade. Such partial degradation can provide the desired permeability of the continuous matrix of interconnected channels while leaving the non-degradable polymer component to function as a structural support. Similarly, in a multicomponent fiber, the degradable polymer component can degrade in situ and leave the non-degradable polymer component to provide the structural support. For example, in an islands-in-the-sea configuration, the sea component can be degradable, and the islands can be formed of non-degradable polymer such that the sea component degrades to provide channels that are permeable to the hydrocarbon but still include the island components as structural support. A variety of multicomponent fiber configurations can be achieved based on such principle. Examples of degradable fibers, including multicomponent fibers, which may be useful according to the present disclosure are provided in U.S. Pat. No. 5,916,678 and U.S. Pat. Pub. No. 2012/0238173, which are incorporated herein by reference in their entireties.

The "non-degradable" polymers useful according to the present disclosure can be polymers that do not substantially degrade under the conditions of use described herein, such as being dispersed in a cementitious medium and injected into a hydrocarbon bearing formation. Thus, the non-degradable fibers may degrade under some conditions but not under the conditions of use described herein. Non-limiting examples of non-degradable polymers useful according to the present disclosure include polyolefins, polyamides, aromatic/aliphatic polyesters, and combinations thereof. Specific examples include polybutylene terephthalate and polyethylene terephthalate. Additional types of materials that may be used include destructurized starch compositions, polyhydric alcohols and derivatives, hydroxypropyl cellulose derivatives, cellulose esters, biodegradable aliphatic polyesters, ethers, urethanes, and biodegradable aliphatic-aromatic polyesters.

The cementitious fracture fluid comprising fibers dispersed in a cementitious medium can be used in a variety of methods according to the present disclosure. The use of the fluid is not limited to fracturing or other stimulation of hydrocarbon bearing formations. Rather, the cementitious fluid can be utilized in any setting where it is desirable to provide a permeable cement matrix. As such, methods of forming a permeable cement matrix can comprise: providing a cementitious fluid as described herein comprising fibers dispersed in a cementitious medium; placing the cementitious fluid at the point of use; and curing the placed cementitious fluid to form the permeable cement matrix.

As a non-limiting example, the cementitious fluid particularly can be used as a fracturing fluid. As such, the present disclosure can provide methods for stimulating a hydrocarbon bearing formation, which specifically is a subterranean formation. In some embodiments, the method may comprise: providing a cementitious fracture fluid comprising fibers dispersed in a cementitious medium; injecting the cementitious fracture fluid into the hydrocarbon bearing formation at a pressure sufficient to create or enlarge a fracture therein; and curing the injected cementitious fracture fluid to form a permeable cement matrix comprising a continuous network of interconnected channels corresponding to the position of the dispersed fibers, the interconnected channels being configured for flow of the hydrocarbon therethrough. The cementitious fracture fluid is provided in a form that is flowable and injectable. As such, the cementitious fracture fluid can be pumped using known techniques that are common in the hydrocarbon production industry.

Figure 1:
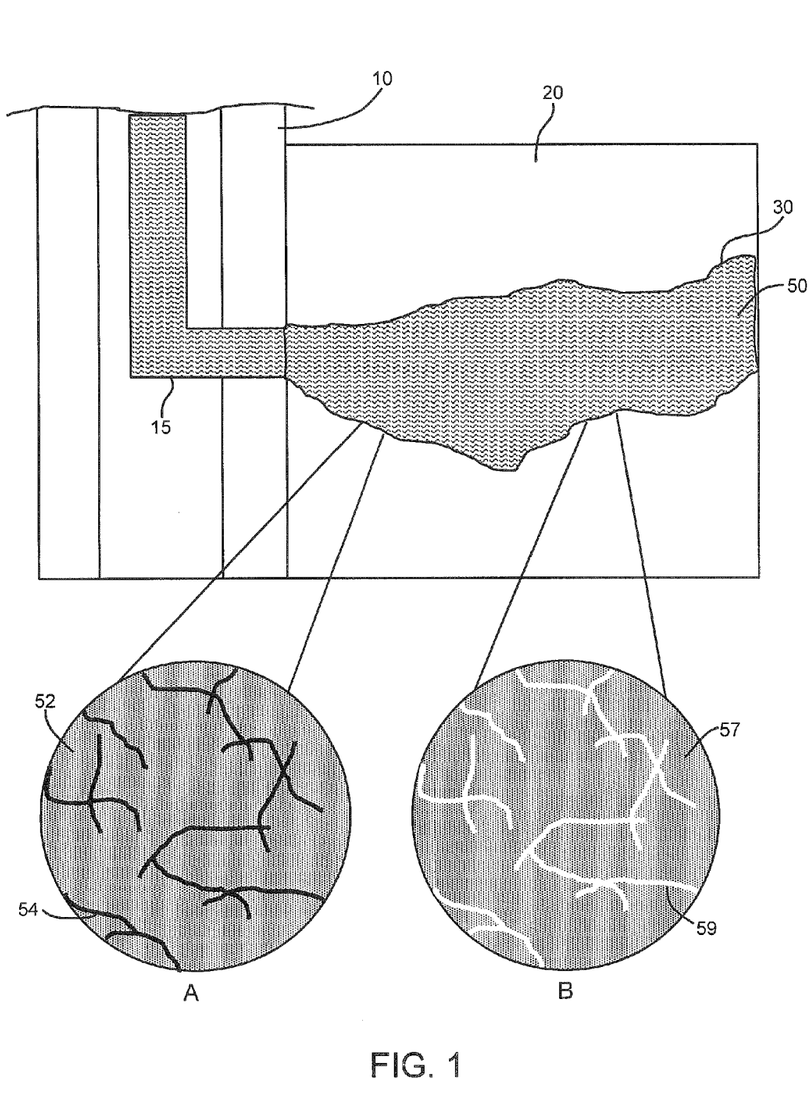
FIG. 1 is an illustration of a hydrocarbon bearing formation that has been fractured utilizing a cementitious fracture fluid according to exemplary embodiments of the present disclosure and further illustrates the nature of the cementitious fracture fluid and the continuous network of interconnected channels present in the cured cement matrix.

A method for stimulating a hydrocarbon bearing formation according to some embodiments of the present disclosure is shown in FIG. 1. A wellbore 10 in a hydrocarbon bearing formation 20 is utilized for injecting a cementitious fracture fluid 50 though piping 15. The fracture fluid 50 forms a fracture 30 in the formation 20, and the fracture is filled with the injected fracture fluid. Callout A illustrates a detailed view of the cementitious fracture fluid during pumping. Specifically, the cementitious medium 52 has dispersed therein a plurality of fibers 54 that randomly intersect. Callout B illustrates a detailed view of the permeable cement matrix 57 resulting from the cured cementitious medium having a continuous network of interconnected channels 59 corresponding to the position of the dispersed fibers 54 prior to degradation of the fibers.

Figure 2:
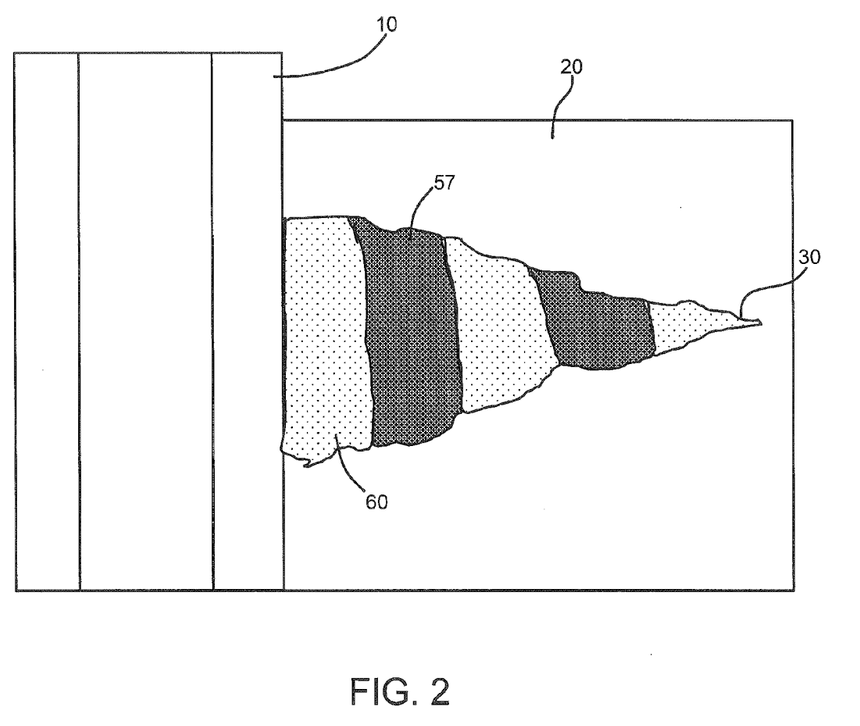
FIG. 2 is an illustration of a hydrocarbon bearing formation that has been fractured utilizing a cementitious fracture fluid according to an exemplary embodiment of the present disclosure wherein the cementitious fracture fluid was injected in an alternating fashion with a spacer fluid that remains in the fracture.

In some embodiments, the cementitious fracture fluid can be introduced to the fracture alternating with a second fluid of a different composition. The second fluid may be defined as a spacer fluid. The spacer fluid can be configured to provide a highly permeable region between sections of permeable cement matrix through which the hydrocarbon can more easily flow. In such embodiments, the sections of permeable cement matrix can maintain the fracture opening, and the sections of the spacer fluid can reduce obstruction of the pathway through the fracture for hydrocarbons moving to the wellbore for production. This illustrated in the embodiment of FIG. 2, wherein a formation 20 adjacent a wellbore 10 includes a fracture 30 that is filled with alternating sections of permeable cement matrix 57 and spacer fluid 60.

The material used in the spacer fluid can be any form of aqueous or organic fluid that rheologically and density matched and that acts as a filler material. The spacer fluid can include a proppant, can be foamed, and/or can contain additives that facilitate segregation of the spacer fluid from the cement matrix. The material in the spacer fluid (on its own or because of the presence of one or more additives) preferably is inert to the curing of the cementitious medium. Examples of stable foams that can be used as spacer fluids according to the present disclosure are described in U.S. Pat. Nos. 7,494,957 and 7,569,522, which are incorporated herein by reference in their entireties.

Figure 3:
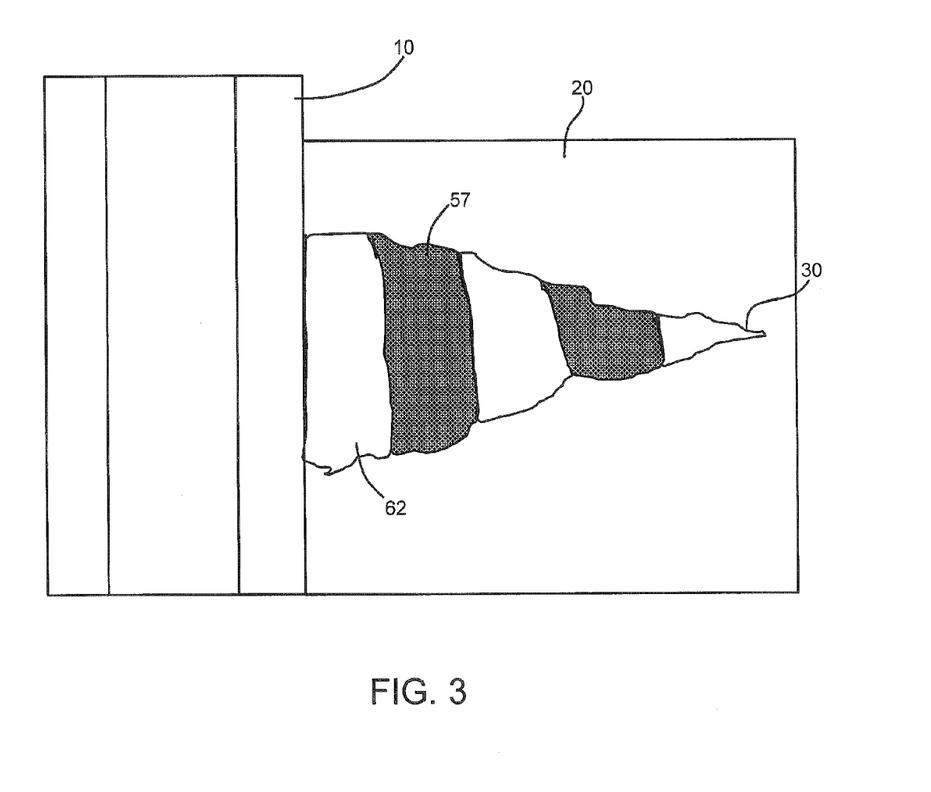
FIG. 3 is an illustration of a hydrocarbon bearing formation that has been fractured utilizing a cementitious fracture fluid according to an exemplary embodiment of the present disclosure wherein the cementitious fracture fluid was injected in an alternating fashion with a spacer fluid that dissolved or disintegrated after curing of the cement matrix.

In some embodiments, the spacer fluid can be degradable or dissolvable after placement within the fracture. Such embodiment is illustrated in FIG. 3 wherein a formation 20 adjacent a wellbore 10 includes a fracture 30 that is partially filled with sections of permeable cement matrix 57. The sections of permeable matrix 57 are separated by cavities 62 that are at least partially open and that are the remnant of spaces that were filled with a spacer fluid (see FIG. 2) that degraded or dissolved after curing of the cement matrix 57. Non-limiting examples of degradable or dissolvable materials that can be used in the spacer fluid include polymeric materials, such as PLA, PGA, polyols, PET, polysaccharides, waxes, salts, calcium carbonate, benzoic acid, naphthalene based materials, magnesium oxide, sodium bicarbonate, soluble resins, sodium chloride, ammonium sulfate, and combinations thereof. Examples of materials that are suitable for use as spacer fluids are described in U.S. Pat. Nos. 7,581,590 and 8,636,035, which are incorporated herein by reference in their entireties.

Methods utilizing a cementitious fracture fluid as described herein can provide a variety of benefits. For example, known fracturing methods utilize proppants that have a tendency to settle, leading to inefficient fracturing and, in turn, significantly reduced conductivity. The present cementitious fluids provide dual activity as the fracture fluid and a bulk proppant. Further cement slurries for well construction have been used for more than a century, and formulation practices for maintaining a suspension at downhole conditions are well understood. Accordingly, complete propagation can be ensured according to the present methods.

The present methods also can provide long-term hydrocarbon production for increased primary recovery. Unlike the single grains of proppant, a set cement mass cannot shift over time. This can ensure long-term fracture integrity and provide dramatic improvements in recovery efficiency. Premature closure of fractures due to proppant movement diminishes production and requires costly re-fracturing operations or additional well construction, and such problems can be substantially avoided according to the present disclosure.

The present methods also can provide for reduced environmental impact by elimination of flowback water. The safe handling and treatment of flowback water causes expense and environmental concerns that are largely eliminated with the use of cement as a fracturing fluid. The water used when formulating the cement slurry is ultimately consumed by the cement hydration reaction, eliminating the water treatment necessary to remove the heavy brines, aromatics, and potentially radioactive species that are carried to the surface during flowback.

In addition to the foregoing, the presently disclosed cementitious fracturing fluid can provide an affordable low-water, non-$CO_2$, and non-organic based stimulation technology that is free of costly engineered proppant materials and extraneous safety measures required for compressed gases or combustible solvents. Because the industry is already familiar with equipment and processes for well cementing, capital expenditures and workforce development needs also can be minimized.

As exemplary embodiments, multiple formulations of cementitious materials with dispersed fibers were prepared using cement slurries form with Class H cement with a 0.40 or 0.50 water to cement (w/c) ratio. Cem-FIL® alkali-resistant 12 mm (or 0.5 inch) glass fiber strands from Owens Corning were dispersed in the cement slurry at concentrations of 5-20% by weight of cement (bwoc). Certain formulations included 0.2% bwoc Diutan Gum as a viscosity modifying agent (VMA) and/or 0.33% bwoc ADVA 575 dispersant. The dispersant was used to help distribute the fibers and reduce clumping. The specific formulations are provided in the following Table. All formulations were made using a Waring blender per the American Petroleum Institute (API) Recommended Practice (RP) 10B protocol used to prepare cement slurries prior to glass fiber addition. The glass fibers in formulation 6 were added and blended during slurry preparation and thereby were subject to the high speed blending portion of the API 10B protocol.

TABLE

| Formulation | w/c ratio | VMA % bwoc | ADVA 575 % bwoc | Glass Fiber % bwoc | Glass Fiber Addition |
|---|---|---|---|---|---|
| 1 | 0.40 | 0.20 | 0.33 | 5 | Slow blend |
| 2 | 0.40 | — | 0.33 | 5 | Slow blend |
| 3 | 0.40 | — | 0.33 | 10 | Hand mix |
| 4 | 0.40 | — | 0.33 | 15 | Hand mix |
| 5 | 0.40 | — | 0.33 | 20 | Hand mix |
| 6 | 0.50 | — | — | 20 | Fast blend-slurry prep |

After mixing the glass fibers into formulation #5 at a 20% bwoc loading, the material was placed into a petri dish and allowed to cure. The glass fibers appeared to wet out and distribute throughout the mix. Material from formulation #6 was placed into a 3 inch×8 inch (W×H) plastic cylindrical canister, closed shut, and allowed to hydrate or cure for at least 48 hours. After curing, 0.5 to 0.75 inch thick disks were cut from the large cylinder. Some of the material was also placed into a large and small petri dish, in order to obtain disk-shaped samples. All samples exhibited distribution of the fibers substantially forming a continuous network.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed herein and that modifications and other embodiments are intended to be included within the scope of the appended claims. Although specific terms are employed herein, they are used in a generic and descriptive sense only and not for purposes of limitation.

The invention claimed is:

1. A method for stimulating a hydrocarbon bearing formation comprising:
   injecting a first fluid of a first composition and a second fluid of a second, different composition into the hydrocarbon bearing formation at a pressure sufficient to create or enlarge a fracture therein, wherein the first fluid is a cementitious fracture fluid comprising fibers dispersed in a cementitious medium; and
   curing the injected cementitious fracture fluid to form a permeable cement matrix comprising a continuous network of interconnected channels corresponding to the position of the dispersed fibers, the interconnected channels being configured for flow of the hydrocarbon therethrough;
   wherein the second fluid is substantially degraded or dissolved during or after said curing of the cementitious fracture fluid so as to form a plurality of open sections alternating with a plurality of sections of the permeable cement matrix.

2. The method according to claim 1, wherein the fibers are selected from the group consisting of hollow fibers, degradable fibers, and combinations thereof.

3. The method according to claim 1, wherein the fibers comprise one or more of hollow glass fibers and polymeric fibers.

4. The method according to claim 1, wherein the fibers comprise a degradable material selected from the group consisting of aliphatic polyesters, polyorthoesters, polyanhydrides, and combinations thereof.

5. The method according to claim 1, wherein the fibers comprise a degradable material selected from the group consisting of polylactic acid (PLA), polyglycolic acid (PGA), copolymers of PLA and PGA (PLGA), polycaprolactone (PCL), thermoplastic starch (TPS), cellulose, polyhydroxyalkanoates (PHAs), blends of phosphate-based glasses and polypropylene, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and combinations thereof.

6. The method according to claim 1, wherein the fibers comprise one or both of hydrolytic ally degradable fibers and enzymatically degradable fibers.

7. The method according to claim 1, wherein the fibers have a melting temperature of about 80° C. to about 190° C.

8. The method according to claim 1, wherein the fibers degrade after said injecting step over a time of about 6 hours to about 240 hours.

9. The method according to claim 1, wherein the cementitious medium comprises a slurry of cement and water.

10. The method according to claim 1, wherein the second fluid comprises a material selected from the group consisting of polylactic acid (PLA), polyglycolic acid (PGA), polyols, polyethylene terephthalate (PET), polysaccharides, waxes, salts, calcium carbonate, benzoic acid, naphthalene based materials, magnesium oxide, sodium bicarbonate, soluble resins, sodium chloride, ammonium sulfate, and combinations thereof.

11. The method according to claim 1, wherein the fibers comprise about 2% to about 40% by volume of the cementitious fracture fluid.

12. The method according to claim 11, wherein the cement comprises an expansive cement.

13. An artificially formed underground structure comprising:
- a hydrocarbon bearing formation with a fracture therein;
- a plurality of sections of an at least partially cured permeable cement matrix formed within the fracture, the cement matrix including a substantially continuous network of interconnected channels configured for flow of the hydrocarbon therethrough; and
- a plurality of at least partially open sections alternating with the plurality of sections of the at least partially cured permeable cement matrix.

14. The artificially formed underground structure according to claim 13, wherein the interconnected channels comprise fibers or remnants thereof.

15. The artificially formed underground structure according to claim 14, wherein the fibers are selected from the group consisting of hollow fibers, degradable fibers, and combinations thereof.

16. The artificially formed underground structure according to claim 14, wherein the fibers comprise one or both of hydrolytically degradable fibers and enzymatically degradable fibers.

* * * * *